United States Patent

Field

[11] Patent Number: 4,732,465
[45] Date of Patent: Mar. 22, 1988

[54] EYEGLASS HOLDER

[76] Inventor: Albertus B. Field, 320 Harbour View Ct., Noblesville, Ind. 46060

[21] Appl. No.: 927,094

[22] Filed: Nov. 5, 1986

[51] Int. Cl.$^4$ .............................................. G02C 5/14
[52] U.S. Cl. ..................................................... 351/123
[58] Field of Search ............... 351/111, 123, 122, 117; 2/311, 338; 128/207.18

[56] References Cited

U.S. PATENT DOCUMENTS

| | | | |
|---|---|---|---|
| 619,163 | 2/1899 | Gieberich | 351/123 |
| 3,172,407 | 3/1965 | Pechmann | 128/207.18 |

FOREIGN PATENT DOCUMENTS 2148477  9/1971  Fed. Rep. of Germany ...... 351/123

Primary Examiner—Rodney B. Bovernick
Assistant Examiner—Kevin Fournier
Attorney, Agent, or Firm—Woodard, Emhardt, Naughton, Moriarty & McNett

[57] ABSTRACT

Holding means for securing a pair of eyeglasses to the wearer's head. A pair of flexible sheets each having a row of apertures provided thereon through which the opposite temple ends of the eyeglasses are extended to form a plurality of spaced apart folds engaging the wearer's head holding the eyeglasses thereto.

6 Claims, 3 Drawing Figures

EYEGLASS HOLDER

BACKGROUND OF THE INVENTION

This invention is in the field of devices for securing eyeglasses to a person's head. Numerous approaches have been devised to prevent eyeglasses or spectacles from falling from a person's head. For example, a chain or string may be extended around the wearer's neck and attached to the opposite ends of the side bars or the temples of the spectacles. In the event the wearer is participating in sports, then it is necessary to provide a more rigid or secure means for preventing dislodgement of the eyeglasses. One approach is to provide a specially constructed pair of eyeglasses having permanently mounted thereto an elastic band extendable around the wearer's head. Another approach is to provide an elastic band extendable around the wearer's head and removably attached to the opposite ends of the side bars or temples. A significant disadvantage of the latter two approaches is that the elastic band forces the lens against the wearer's eyebrows or skin providing not only discomfort, but allowing sweat to flow onto the lens and eventually impede vision. In view of such disadvantage, many people will simply not utilize an elastic band, and instead bend the tips of the temples to more securely mount the eyeglasses. Eventually, the temples will become misaligned and in fact may even break as the plastic material becomes brittle with age. An alternative approach is to mount a plug to the tips of the temples with each plug having a rough surface to increase the friction between the person's head and temple. Such plugs provide less than satisfactory results since they either fall off the temples or do not provide sufficient holding means for securing the eyeglasses to the wearer's head.

Disclosed herein is a totally new type of device for securing the eyeglasses to the wearer's head which avoids the aforementioned disadvantages while being considerably less expensive to manufacture and providing superior holding capability.

SUMMARY OF THE INVENTION

One embodiment of the present invention is a device mountable to the temple of spectacles to hold the spectacles on a person's head comprising a flexible sheet of material including a plurality of apertures through which the temple is extendable in zigzag fashion relative to the sheet to alternately position the sheet on a side of the temple to contact the person's head and then on a side of the temple away from the person's head and back.

Another embodiment of the present invention is a device for limiting relative motion between a person's eye glasses and the person's head comprising a first flexible sheet of material including a plurality of apertures through which one of the eye glass temples is extendable in zigzag fashion relative to the sheet forming resilient holding means in the sheet having a plurality of spaced apart folds contactable with the person's head to limit relative motion between the eye glasses and the person's head.

Yet another embodiment of the present invention is the combination of eye glasses including a frame and a pair of lenses mounted to the frame and further including first and second side bars pivotally mounted to the frame and extendable aft of the ears of the person's head, a first flexible sheet of material including a plurality of first apertures through which the first side bar is extendable in zigzag fashion relative to the sheet to alternately position the sheet on a side of the first side bar to contact the person's head and then on a side of the first side bar away from the person's head and back, and, a second flexible sheet of material including a plurality of second apertures through which the second side bar is extendable in zigzag fashion relative to the second sheet to alternately position the second sheet on a side of the second side bar to contact the person's head and then on a side of the second side bar away from the person's head and back.

It is an object of the present invention to provide a new and improved means for securing eyeglasses to a person's head.

It is a further object of the present invention to provide means for securing eyeglasses to a wearer's head without forcing the lenses against the wearer's skin.

In addition, it is an object of the present invention to provide a relatively low cost superior holding means for securing eyeglasses to a wearer's head.

Related objects and advantages of the present invention will be apparent from the following description.

DESCRIPTION OF THE PREFERRED EMBODIMENT

Figure 1:
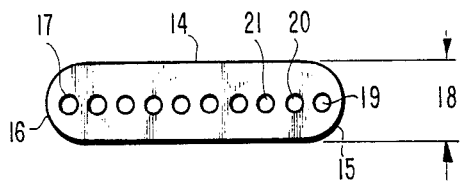
FIG. 1 is a plan view of the holding means incorporating the present invention.

For the purposes of promoting an understanding of the principles of the invention, reference will now be made to the embodiment illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Figure 2:
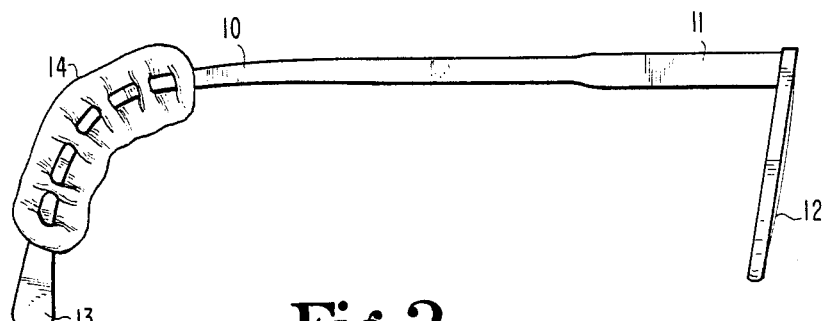
FIG. 2 is a plan view of an eyeglass temple having the holding means of FIG. 1 mounted thereto.
Figure 3:
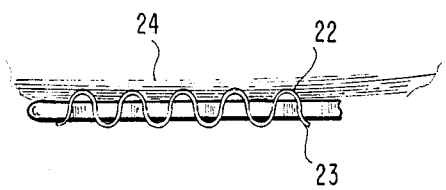
FIG. 3 is a top view of the temple and holding means of FIG. 2.

Referring now more particularly to FIG. 2, there is shown a conventional side bar or temple 10 having a proximal end 11 pivotally mounted to a conventional eyeglass frame having a pair of lenses 12 mounted thereto. The distal end 13 of temple 10 may be curved to extend around the wearer's ear or may simply extend parallel outwardly in the same direction as the main body of the temple to extend aft of the wearer's ear. Removably mounted to each temple 10 are a pair of flexible sheets which are each mounted in zigzag fashion to the distal end of each temple to secure the eyeglasses to the wearer's head. One such flexible sheet 14 will now be described, it being understood that an identical description applies to the second sheet of material mounted to the opposite temple.

Sheet 14 is elongated in configuration having a pair of opposite curved ends 15 and 16 between which are located a single row of apertures extending through the sheet. In the embodiment depicted in FIG. 1, sheet 14 includes 10 such apertures 17 each having an aproximate diameter of $\frac{1}{8}$ inch with adjacent apertures being spaced approximately 1/16 inch apart. In the same embodiment, the width 18 of the sheet was approximately ¼ inch, whereas the length was 2 inches and with the sheet having a thickness of approximately 1/32 inch. The overall size of the sheet along with the number of apertures may be varied so long as there are sufficient apertures to allow the sheet to wind from one side of the temple to the opposite side of the temple providing a number of folds for contacting the person's head. Best results have been obtained by producing the sheet from surgical latex in order to avoid irritation of the wearer's skin.

In order to mount flexible sheet 14 to temple 10, the temple tip 13 is first extended through aperture 19, aperture 20, and aperture 21 in sequential fashion and so on, until the temple tip is extended through the aperture located at the opposite end of the sheet. Thus, utilizing a sheet having ten such apertures, a total of five folds or creases 22 are located on one side of the temple with six such folds or creases 23 being located on the opposite side of the temple. The sheet is alternatively positioned on the opposite sides of the temple forming a plurality of spaced apart folds 22 which engage the person's skin or hair 24 thereby holding the temple securely to the wearer's head. Folds 22 are spaced apart forming a spring means or resilient holding means extending the length of the sheet allowing the temple to slightly move relative to the head, but limiting complete dislodgement of the temple. The folds absorb shock encountered when the eyeglasses and head are subjected to violent motion.

The flexible sheet has an elongated flat configuration prior to the mounting of the sheet to the temple with the sheet assuming an accordion like configuration once the temple is extended in zigzag fashion through the row of apertures. The circular apertures may assume an elongated configuration depending on the cross-sectional configuration of the temple. While although only a single sheet has been shown mounted to one temple, it is to be understood that an identical sheet is mounted to the opposite temple of the eyeglasses.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

What is claimed is:

1. The combination:
   eye glasses including a frame and a pair of lenses mounted to said frame and further including first and second side bars pivotally mounted to said frame and extendable aft of the ears of the person's head;
   a first flexible sheet of material including a plurality of first apertures through which the first side bar is extendable in zigzag fashion relative to said sheet to alternately position said sheet on a side of said first side bar to contact the person's head and then on a side of said first side bar away from the person's head and back; and,
   a second flexible sheet of material including a plurality of second apertures through which the second side bar is extendable in zigzag fashion relative to said second sheet to alternately position said second sheet on a side of said second side bar to contact the person's head and then on a side of said second side bar away from the person's head and back.

2. The device of claim 1 wherein each sheet has an elongated flat configuration prior to mounting to said side bars with said first apertures arranged in a row along the length of said first sheet and with said second apertures arranged in a row along the length of said second sheet.

3. The device of claim 2 wherein each sheet assumes an accordion configuration when mounted to said side bars with said side bars being extendable through each aperture in sequential fashion forming a plurality of folds in each sheet in contact with the person's head limiting movement between said side bars and the person's head.

4. The device of claim 3 wherein said material is surgical latex.

5. The combination:
   eye glasses including a frame and a pair of lenses mounted to said frame and further including first and second side bars extendable against the person's head; and,
   a first flexible sheet of material including a plurality of first apertures through which the first side bar is extendable in zigzag fashion relative to said sheet to alternately position said sheet on a side of said first side bar to contact the person's head and then on a side of said first side bar away from the person's head and back.

6. The combination of claim 5 and further comprising:
   a second flexible sheet of material including a plurality of second apertures through which the second side bar is extendable in zigzag fashion relative to said second sheet to alternately position said second sheet on a side of said second side bar to contact the person's head and then on a side of said second side bar away from the person's head and back.

* * * * *